United States Patent
Doczy et al.

(10) Patent No.: US 6,884,986 B2
(45) Date of Patent: Apr. 26, 2005

(54) VEHICLE SIGNAL CONTROL MODULE AND SYSTEM

(75) Inventors: Emil Doczy, Edwardsburg, MI (US); Earl H. Whetstone, Granger, IN (US)

(73) Assignee: Dee Enterprises, LLC, Elkhart, IN (US)

( * ) Notice: Subject to any disclaimer, the term of this patent is extended or adjusted under 35 U.S.C. 154(b) by 118 days.

(21) Appl. No.: 10/232,287

(22) Filed: Aug. 30, 2002

(65) Prior Publication Data

US 2002/0195947 A1 Dec. 26, 2002

Related U.S. Application Data

(63) Continuation-in-part of application No. 09/273,088, filed on Mar. 19, 1999, now Pat. No. 6,448,548.

(51) Int. Cl.[7] ................................................ B60G 1/34

(52) U.S. Cl. ........................ 250/214 R; 250/214 SW; 250/221; 340/475; 200/61.32

(58) Field of Search ................... 250/214 R, 214 SW, 250/221, 216; 340/468, 471, 475, 476, 477; 200/61.27, 61.3, 61.32, 61.54

(56) References Cited

U.S. PATENT DOCUMENTS

| | | | |
|---|---|---|---|
| 4,333,071 A | 6/1982 | Kira et al. | |
| 4,972,174 A | 11/1990 | Onan et al. | |
| 5,260,685 A | 11/1993 | Parker | |
| 5,780,795 A | 7/1998 | O'Reilly | |
| 6,020,813 A | * 2/2000 | Harris et al. | ................ 340/465 |

* cited by examiner

*Primary Examiner*—Kevin Pyo
(74) *Attorney, Agent, or Firm*—Baker & Daniels

(57) ABSTRACT

A switching mechanism for controlling vehicle headlights, turn signals, and emergency flashers includes a housing mounted on a control stock rigidly mounted to the vehicle steering column. The housing includes depressions for each of the functions, and light source and optical responsive switch on opposite sides of each depression, the light source being aimed at the optical switch whereby a light beam traverses the depression. A controller is responsive to interruption of the beam by the vehicle operator placing a finger in the depression to control the corresponding vehicle function. The mechanism includes an algorithm executable on a microprocessor for controlling the turn signal switching function. The microprocessor receives input signals from switches activated by the vehicle operator and a vehicle speed sensor, and based on the algorithm, the turn signal function is controlled.

6 Claims, 6 Drawing Sheets

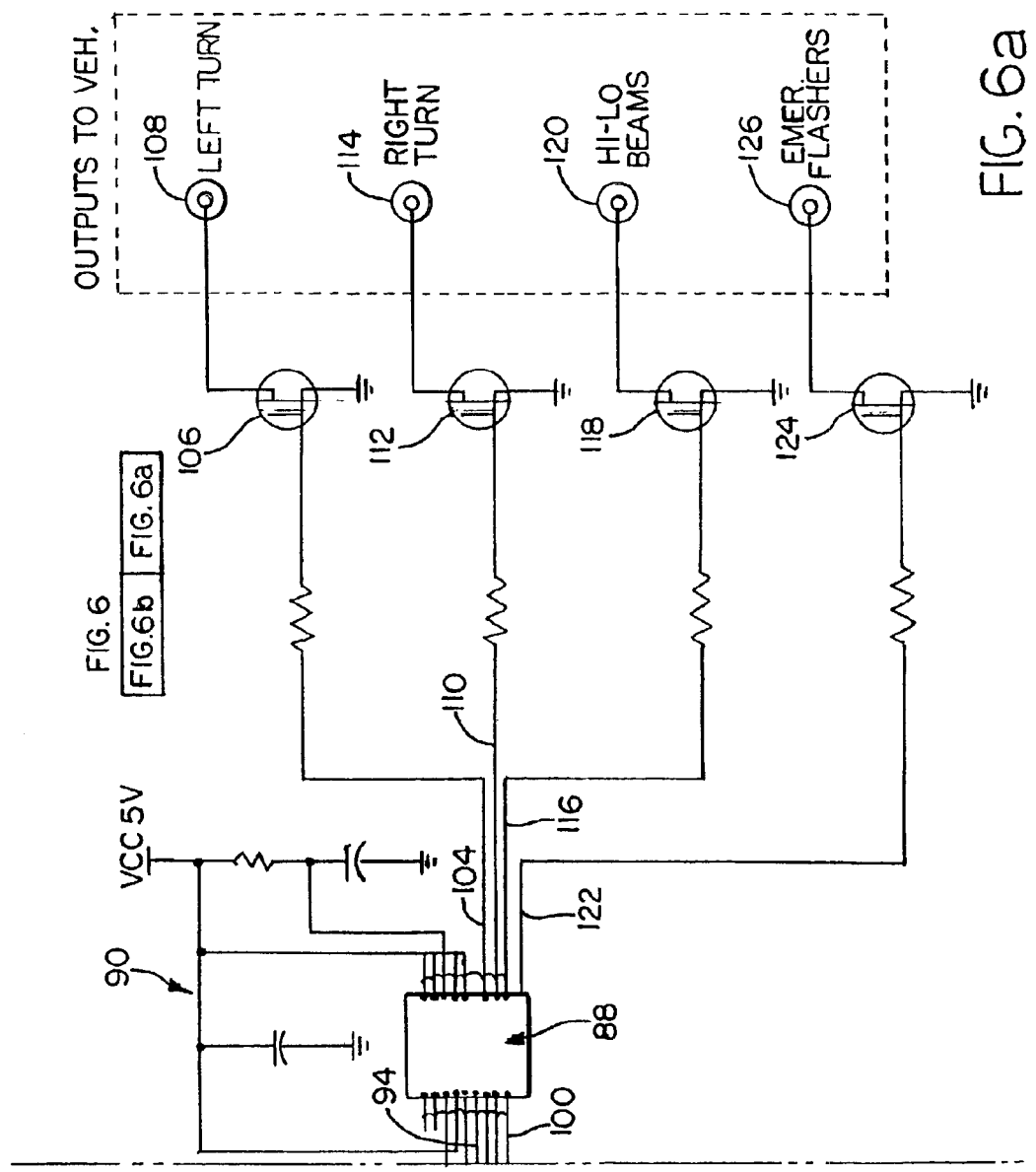

US 6,884,986 B2

VEHICLE SIGNAL CONTROL MODULE AND SYSTEM

The present application is a Continuation-In-Part of U.S. application Ser. No. 09/273,088 filed on Mar. 19, 1999, now U.S. Pat. No. 6,448,548, in the name of inventors Emil Doczy and Earl H. Whetstone assigned to the assignee of the present application.

BACKGROUND OF THE INVENTION

This invention relates to a vehicle signal control module and system for controlling the turn signal lamps, emergency flasher lamps, and high/low headlight beams of an automotive vehicle, and is particularly suited for heavy-duty vehicles such as buses and tractor-trailer combination vehicles.

Automotive vehicles, including heavy duty vehicles such as buses and tractor-trailer heavy duty combination vehicles, are equipped with turn signal control systems which include a stock projecting from the steering column which is operated by the vehicle operator to control switching to operate the vehicle turn signals. These switches are electromechanical devices and, in the case of heavy-duty trucks and buses used in congested areas, are operated multiple times daily and often wear out long before the vehicle wears out. Accordingly, it has become common, particularly with such heavy-duty vehicles, to provide aftermarket replacement controls for repair purposes, which are relatively expensive in component costs as well as vehicle down time. In addition to turn signals, modern vehicles are equipped with emergency flasher lights, which require a separate control, and are also equipped with high/low headlight beam controls, which are also separate from the turn signal and emergency flasher control switches.

In the case of heavy duty tractor-trailer combination vehicles and buses, the vehicle when effecting a turn must first pull out in a direction opposite the direction in which the turn is made and then effect the turn, all to permit the rear portion of the vehicle to pull smoothly around the corner. This pre-turn will cause a mechanically self-controlling switch to cancel the turn indicators prior to the actual turn or completion of the turn. Accordingly, turn signal control units used on heavy-duty vehicles are generally not self-canceling, as are the turn signal controls used on passenger cars and other smaller vehicles. The driver of a heavy vehicle tractor-trailer combination vehicle must remember to manually move the turn signal control stock back to the off position after the turn has been effected.

SUMMARY OF THE INVENTION

The present invention provides a multifunction control module for use on heavy-duty vehicles. The control module is in the form of a switching mechanism combined with a software algorithm to control the turn signal function on the vehicle.

According to the present invention, a switch housing is mounted on the end of a control stock which is rigidly mounted to the vehicle's steering column. Depressions or cavities are provided in the top, side and end edges of the housing and are sized to accommodate a finger of a human hand. A light source, such as a light emitting diode, emits a beam of infrared light which traverses the cavity of the depression. An optically responsive solid state switch is mounted on the opposite side of the cavity or depression from the light emitting diode and normally receives the beam from the diode. The light emitting diode and the optically responsive switch are connected to a microprocessor, which is responsive to the signal emitted by the switch when the beam of light is broken to actuate the turn signals. Accordingly, the operator of the vehicle merely inserts a finger in the corresponding depression or cavity to actuate the left or right turn signals. The signal remains on until the operator again places his finger in the depression or cavity to turn the signal off or is switched off by the microprocessor acting on vehicle speed information. A similar depression or cavity and switching arrangement is provided in the end of the housing to control the vehicle high/low beam head lamps, and a cavity is provided in the top of the housing to control the emergency flashers. Accordingly, these functions are controlled from a single stock and housing, which may be manufactured relatively inexpensively, and which requires no moving parts. Accordingly, the life of the unit is substantially indefinite.

BRIEF DESCRIPTION OF THE DRAWING FIGURES

These and other features of the present invention will become apparent from the following description, with reference to the accompanying drawings, in which.

Figure 1:
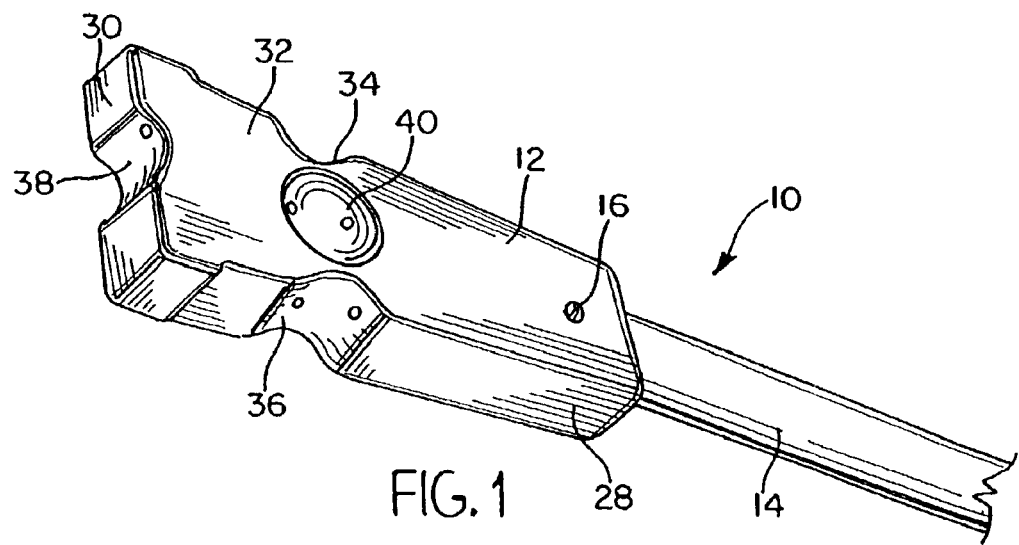
FIG. 1 is a view in perspective of a switching mechanism made pursuant to the teachings of the present invention.
Figure 2:
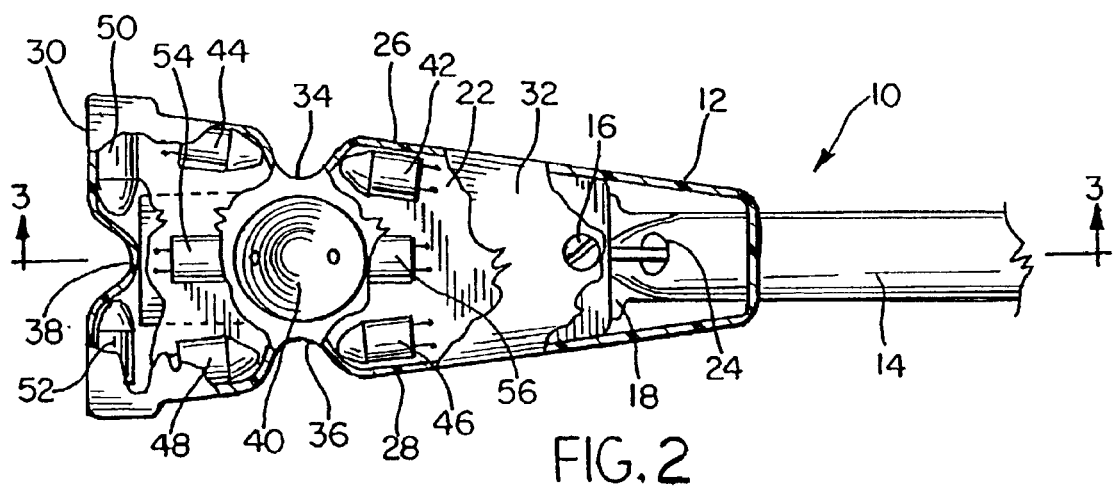
FIG. 2 is a top plan view, partly in section, of the switching mechanism illustrated in FIG. 1.
Figure 3:
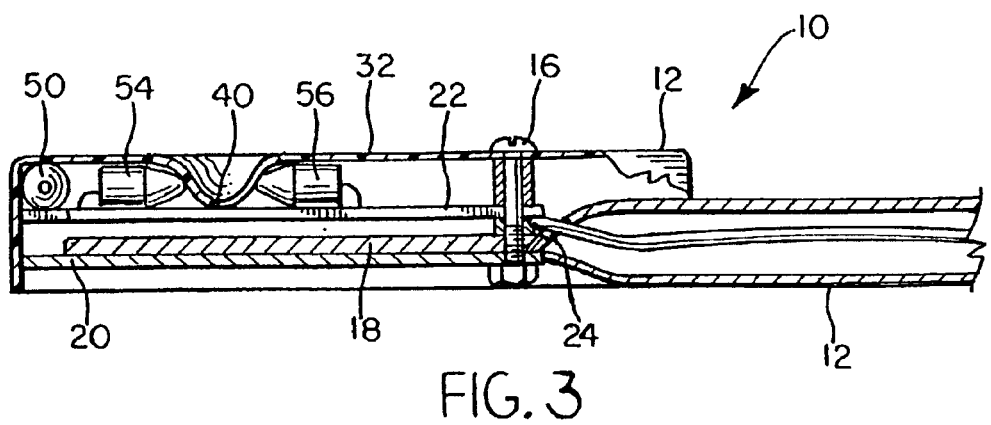
FIG. 3 is a cross sectional view taken substantially along lines 3—3 of FIG. 2.
Figure 4:
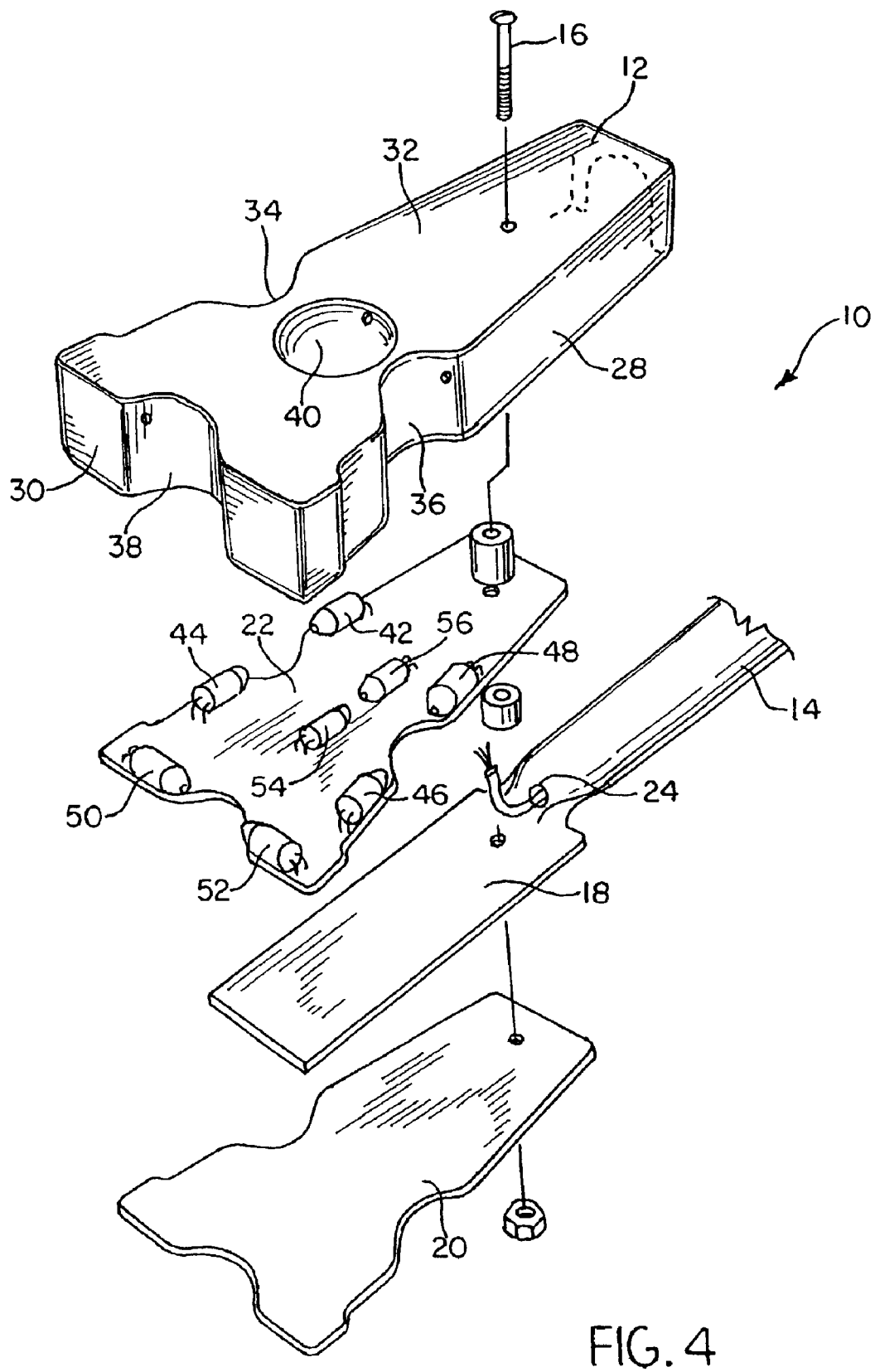
FIG. 4 is an exploded view in perspective of the switching mechanism illustrated in FIGS. 1–3.
Figure 5:
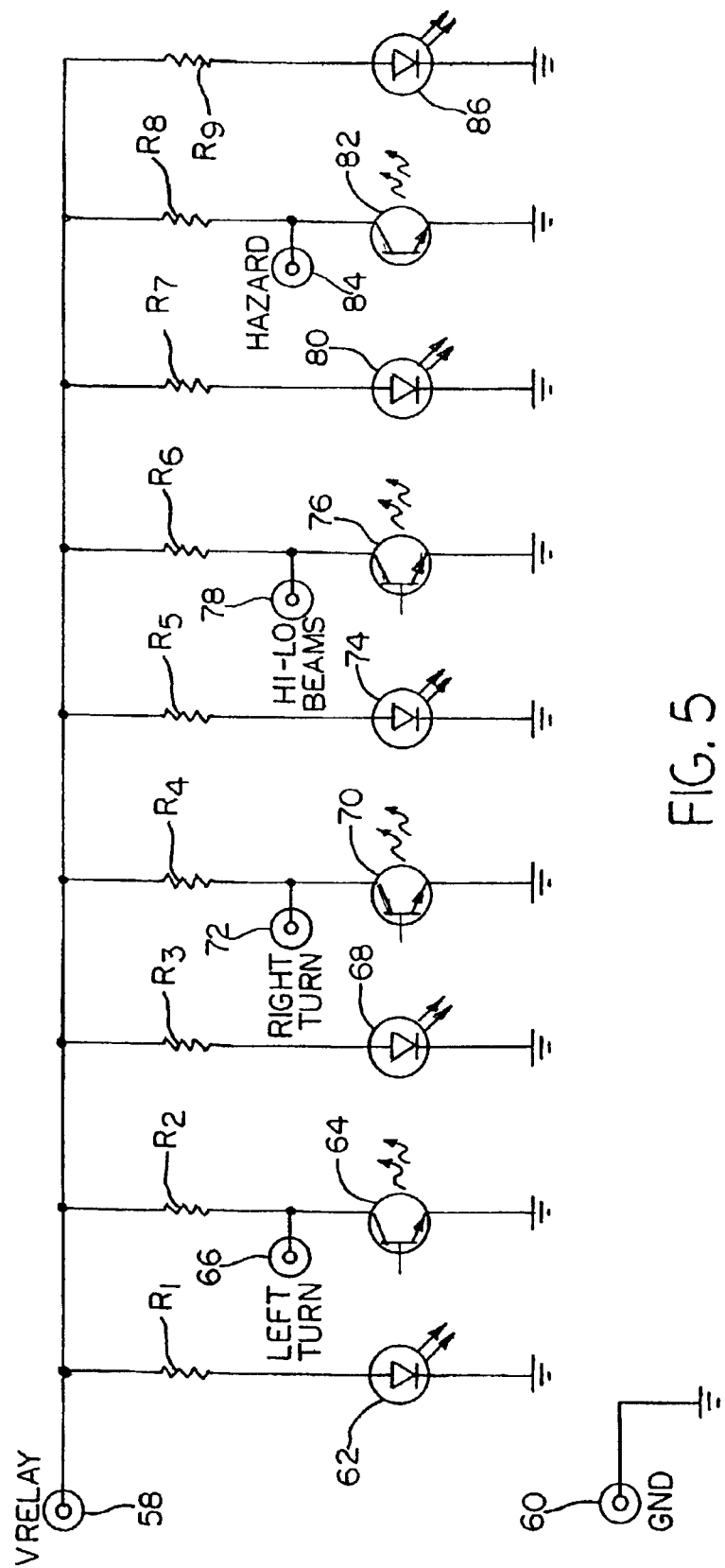
Figure 6B:
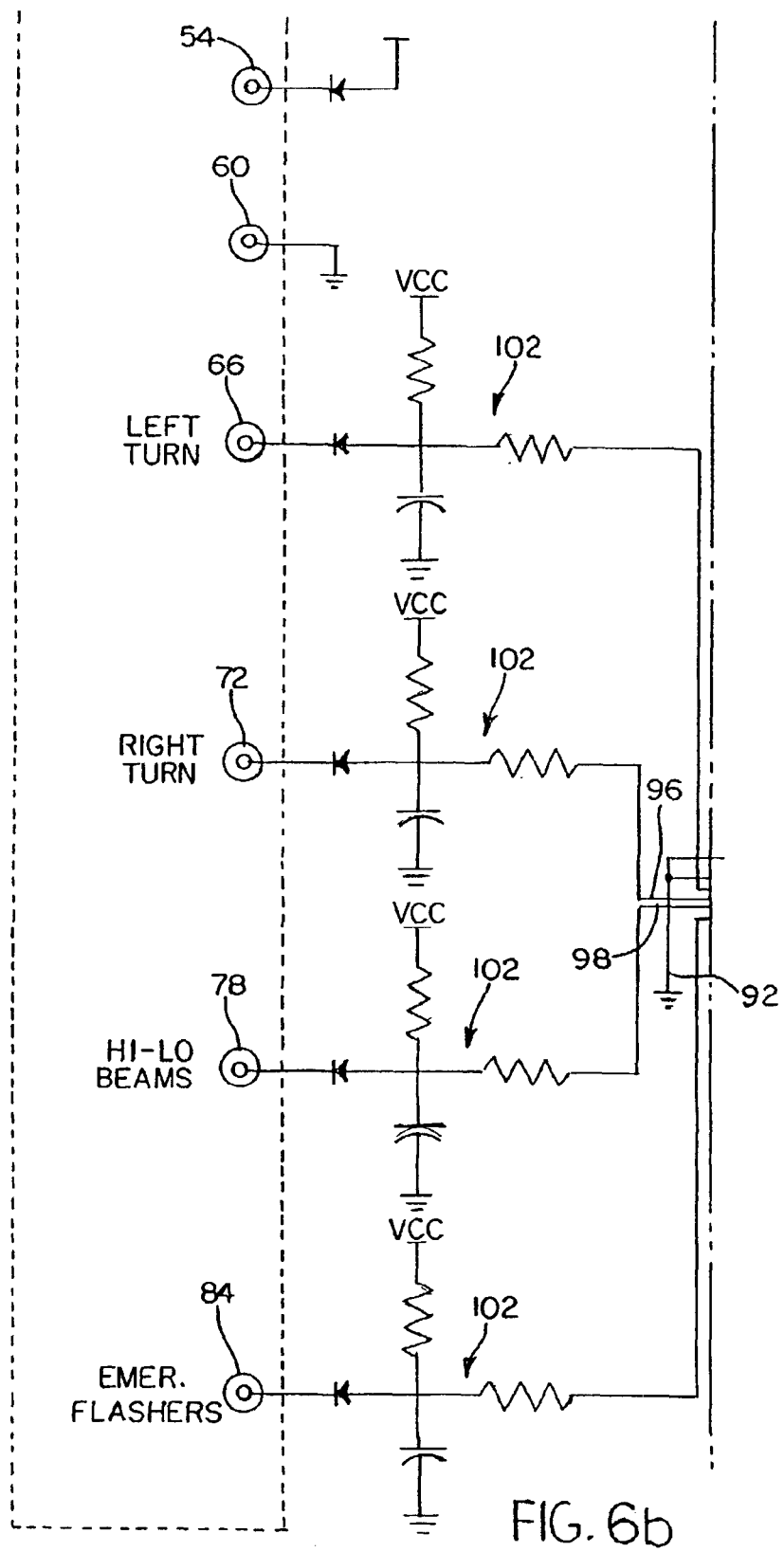

FIG. 5 is an electrical schematic illustrating the manner in which the various components of the housing illustrated in FIGS. 1 and 2 are electrically interconnected; and FIGS. 6a and 6b are electrical schematic illustrations of the manner in which the output of the switching device illustrated in FIGS. 1 and 2 controls various vehicle functions.

Figure 7:
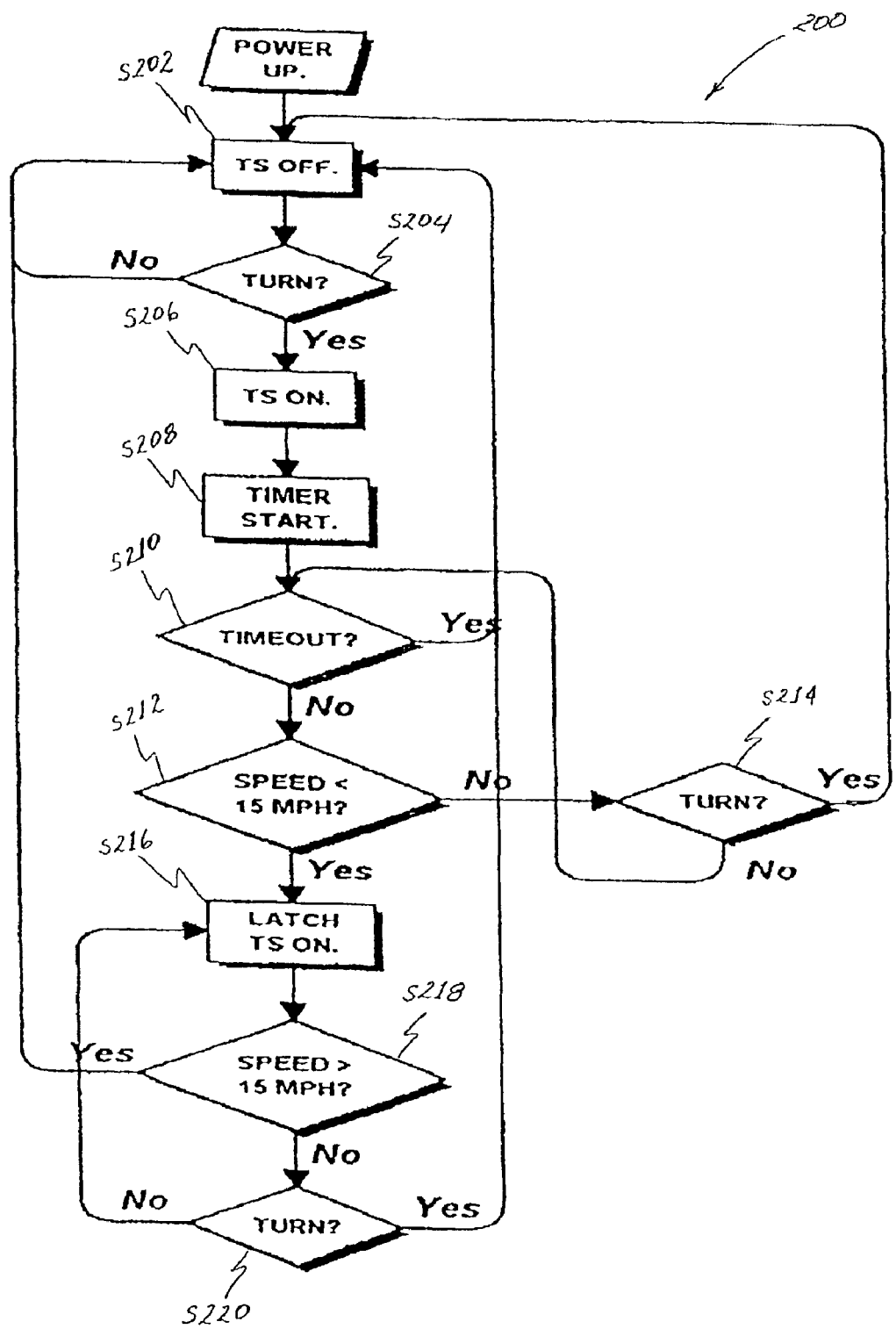

FIG. 7 is a flow chart illustrating one preferred embodiment of a turn signal control algorithm in accordance with the present invention.

DETAILED DESCRIPTION OF THE PREFERRED EMBODIMENTS

Referring now to the drawings, a vehicle signal module generally indicated by the numeral 10 includes a housing 12 which is rigidly mounted to a stock 14 by a fastener 16 which extends through the housing 12, a flattened portion 18 of the stock 14 and a bottom cover member 20. The stock 14 is rigidly mounted on the vehicle steering column. A printed circuit board 22 is mounted between the housing 12 and the cover member 20 to provide the necessary electrical connections within the housing 12 as will hereinafter be explained. The stock 14 is provided with an opening 24 to permit wires fed through the stock 14 to be connected to the circuit board 22.

The housing 12 includes a side edge 26, an opposite side edge 28 an end edge 30, and a transverse surface 32 extending between the edges 26, 28 and 30. The orientation of the various surfaces 26–32 is illustrated in FIG. 1 in the positions which they assume when the stock 14 is installed on the aforementioned steering column (not shown). Depressions or cavities 34, 36 and 38 and 40 are provided in the top 32, end 30 and transverse edges 26–28, respectively. The depressions or cavities 34–40 are sized to accept a human finger. Holders 42, 44 support a conventional light emitting diode and an optically responsive solid state switch, respectively, on opposite sides of the depression 34. Accordingly, a light beam emitted by the light emitting diode transverses the cavity 34 and is received by the optically responsive switch mounted in holder 44. Accordingly, when the operator inserts a finger into the depression or cavity 34, the beam transmitted by the light emitting diode in holder 42 and received by the solid state switch in holder 44 is interrupted. Similar holders 46 and 48; 50 and 52; and 54 and 56 are installed on opposite sides of the cavities 36, 38 and 40, respectively. Accordingly, when a human finger is inserted in any of the cavities 34–40, the corresponding light beam transmitted by the corresponding light emitting diode and received by the optically responsive solid state switch will be broken.

Referring now to FIG. 5 which illustrates schematically the various electrical connections within the housing 12 provided by the circuit board 22, connectors 58, 60 provide connections with the regulated vehicle voltage supply and ground, respectively. A light emitting diode 62 is connected between the power supply and ground through a bias resistor R1, and an optically responsive solid state switch 64 is connected between power supply and ground through a bias resistor R2. The light emitting diode 62 and switch 64 are installed in holders 42, 44, and, as discussed above, the switch 64 responds to breaking of the beam provided by the light emitting diode 62 to change the state of the signal at left turn output terminal 66. Similarly, light emitting diode 68 and optically responsive solid state switch 70 are connected between power and ground through bias resistors R3 and R4, respectively, and are installed within holders 46 and 48 on opposite sides of the depression or cavity 36. The switch 70 responds to an interruption of the light beam received from light emitting diode 68 to change the state of the signal at the output terminal 72. Still another light emitting diode 74 and optically responsive solid state switch 76 are connected between power and ground through appropriate bias resistors R5 and R6, respectively. The light emitting diode 74 and switch 76 are installed in holders 50 and 52 on opposite sides of the depression or cavity 38. The switch 76 is responsive to interruption of the beam of light received from light emitting diode 74 to change the state of the signal at output terminal 78. Light emitting diode 80 and optically responsive solid state switch 82 are connected between power and ground through appropriate bias resistors R7 and R8. The light emitting diode 80 and switch 82 are installed in holders 54, 56 on opposite sides of the cavity or depression 40. The switch 82 responds to interruption of the beam of light received from light emitting diode 80 to change the state of the signal at output terminal 84. A light emitting diode 86 is connected between the power and ground through a bias resistor R9 and is mounted on the housing 12 in an appropriate place (not shown) to provide an indication that power is being supplied to the housing.

Referring now to FIGS. 6a and 6b, a microprocessor generally indicated by the numeral 88 is connected to power through a conventional regulating and filtering circuit generally indicated by the numeral 90 and is also connected to ground as indicated at 92. Input terminal 94 of microprocessor 88 is connected to terminal 66, terminal 96 of microprocessor 88 is connected to terminal 72 input terminal 98 of microprocessor 88 is connected to terminal 78, and input terminal 100 of microprocessor 88 is connected to terminal 84. Each of the terminals 66, 72, 78 and 84 are connected to their corresponding input terminals of microprocessor 88 through appropriate voltage regulating filtering and protection circuitry generally indicated by the numeral 102. The microprocessor 88 also has an input (not shown) connected to a signal representing vehicle speed from the multiplex data buss.

Output terminal 104 of microprocessor 88 is connected to a solid state switching device 106, which is responsive to a change of state of terminal 104 to switch left turn signals connected to a terminal generally indicated at 108. Output terminal 110 of microprocessor 88 is connected to solid state switching device 112, which is responsive to a change of state of output terminal 110 to switch the right turn signals connected to terminal generally indicated by the numeral 114. Output terminal 116 of microprocessor 88 is connected to a solid state switch 118 which is responsive to a change of state on terminal 116 to switch the vehicle head light beams from the high beam to the low beam (or vice versa) which are connected to terminal generally indicated by the numeral 120. Output terminal 122 of microprocessor 88 is connected to solid state switching device 124 which is responsive to a change of state on terminal 122 to switch on or off the vehicle emergency flashers connected to a terminal generally indicated by the numeral 126.

In operation, when the vehicle operator desires to signal a left turn, the operator places a finger in the cavity or depression 34, thereby interrupting the beam between the light emitting diode 62 and the optically responsive solid state switch 64. Accordingly, the signal at terminal 66 changes state and microprocessor 88 responds to this change of state (which is transmitted to the microprocessor through input terminal 94) to generate a signal switching the solid state switch 106 to turn on the left turn signals connected to terminal 108. Microprocessor 88 is programmed to maintain the signal on output terminal 104 even after the operator removes his finger from cavity or depression 34, whereupon the optically responsive solid state switch 64 switches back to its initial state, thus removing the signal from input terminal 94 of microprocessor 88. Microprocessor 88 is programmed to turn off solid state switch 106 by changing the state on output terminal 104 if the vehicle operator again places his finger in the cavity 34 causing the terminal 94 to change state, and is also programmed to turn off the solid state switch 106 if the vehicle speed exceeds a predetermined level. When the vehicle operator desires to signal a right turn, the vehicle operator places a finger in the cavity 36 thereby causing optically responsive solid state switch 70 to signal microprocessor 88 to turn on solid state switch 112 to actuate the right turn signals connected to terminal 114. Of course, the vehicle operator turns off the right turn signals by again placing the finger cavity 36 thereby signaling microprocessor 88 to turn solid state switch 112 off. The microprocessor is also programmed to turn off switch 112 when the vehicle speed attains a predetermined level and/or a predetermined time period has elapsed. It will be noted that the stock 14 is conveniently mounted the steering wheel so that the vehicle operator may place a finger in the cavity 34 or 36 without removing his hand from the wheel. This concept is such that the switch is totally independent of the vehicle steering column. It may be located in any location which is ergonomically desirable.

When the vehicle operator desires to switch the vehicle head lamps to high beam from low beam, the vehicle operator places a finger in the cavity 38, thereby causing optically responsive solid state switch 76 to change the state on terminal 78 which signals microprocessor through input terminal 98 to change the state on output terminal 116 thereby switching the solid state switching device 118 to switch the head lights connected to terminal 120 to the high beams. The microprocessor 88 is programmed to maintain the signal on the terminal 116 even after the vehicle operator has removed his finger from cavity 38. When the vehicle operator again places his finger in cavity 38, the microprocessor 88 responds to the signal transmitted to input terminal 98 to switch solid state switch 118 back to its initial state, thereby switching the head lights from the high beams to the low beams.

When the vehicle operator desires to actuate the vehicle warning flashers, the vehicle operator places a finger or thumb in the cavity 40, thereby causing the optically responsive solid state switch 82 to change the state on terminal 84. This change of state is communicated to microprocessor 88 through input terminal 100, which responds to change the state on output terminal 122, causing the solid state switch 124 to switch on the emergency flashers 126. These emergency flashers remain on after the vehicle operator removes his finger or thumb from cavity. When the vehicle operator again places his finger or thumb in cavity 40, microprocessor 88 responds to the corresponding change of state on input terminal 100 to change the state of output terminal 122, thereby switching off the solid state switch 124 to turn off the flashers connected to the terminal 126. Microprocessor 88 is also programmed to turn off and/or prevent the turning on of the flashers connected to terminal 126 when the vehicle speed exceeds a predetermined level.

Microprocessor 88 can be integral with the signal module 10 or alternatively external to the signal module 10. When external signal module 10 microprocessor 88 can be either a stand alone unit or part of a more comprehensive ECU (electronic control unit) controlling several of the vehicles electronic functions. Microprocessor 88 contains reusable memory in one of various forms well known in the art and is operable to execute the algorithms represented by the flow chart of FIG. 7 to control the signal functions herein before described.

Turning to FIG. 7, the algorithm 200 for turn signal operation will be described. Although only one circuit is shown, it should be understood that separate circuits are provided for the left and right turn signals. Turn signal control will be described from the perspective of the left turn signal.

Upon application of power, the microprocessor loads turn signal timeout and maximum speed constants into memory. Also on power on, microprocessor 88 signals switch 106 to turn the left turn signal off as instructed by the algorithm at step S202. At step, S204 the microprocessor 88 is instructed to test for a left turn signal request from the vehicle operator. If a left turn signal request is found, the algorithm instructs the microprocessor to signal switch 106 turning on the left turn signal. Execution continues at step S208 where a timer is started to monitor the length of time that the turn signal has been on. At step S210, microprocessor 88 is operable to compare the timer value to the timeout constant.

If the timer value is found to exceed the time out constant, the algorithm transfers control back to step S202 turning off the turn signal and started a new turn signal monitoring cycle. If the timer value has not exceeded the time out constant at step S210, processing continues to step S212. At step S212, the algorithm instructs the microprocessor 88 to read the vehicle speed signal from a vehicle speed sensor (not shown) which is of known construction to those skilled in the art. The algorithm instructs microprocessor 88 to compare the vehicle speed with the maximum speed constant. If the algorithm determines that the vehicle speed is not less than the maximum speed constant, execution continues at step S214. At S214, the algorithm makes an additional check to be certain that the operator has not manually cancelled the turn signal. If there is no request from the operator to cancel the turn signal, control is transferred to step S210 where a comparison of the turn signal activation time to the pre-determined time out constant is repeated. If at step S214 it is found that the vehicle operator has manually turned off the turn signal, control is transferred back to step S202 where the turn signal is turned off.

Returning to step S212, if the vehicle speed is determined by the algorithm to be less than the vehicle speed constant, processing continues to step S216 where the turn signal is latched on which means that the operation of the turn signal is now controlled only by the vehicle speed, that is, activation time is no longer considered. At step S218, another speed comparison is made. If the vehicle speed is now greater than the maximum speed constant, control is transferred back to step S202 where the turn signal is turned off and the cycle is repeated. If at step S218 the vehicle speed has not exceeded the maximum speed constant value, processing continues at step S220 where another test for input from the operator is made. At step S220, a test is made for manual cancellation of the turn signal. If at step S220, it is determined that the vehicle operator wants to manually cancel the turn signal, control is transferred back to step S202 where the turn signal is turned off and the cycle is restarted.

If at step S220 there is no input from the operator to manually cancel the turn signal, control is transferred back to step S216 where the signal at switch 106 is maintained and the turn signal is kept on. The algorithm then repetitively executes steps S216, S218, and S220 until either the turn signal is manually cancelled or the vehicle speed exceeds the turn signal maximum speed constant.

It should be understood from the discussion above that the processor advantageously prevents leaving the turn signal on. This is done through the steps S210 and S218, where the processor queries whether the turn signal is timed out, or whether the speed has exceeded 15 mph, in either event, the signal is canceled.

What is claimed is:

1. A signal control system for a vehicle comprising:

a control circuit operable to control at least one vehicle function;

at least one input switch in communication with said control circuit and operable to produce an input signal associated with said at least one vehicle function, said input signal receivable by said control circuit; and at least one function switch in communication with said control circuit and operable to switch said at least one vehicle function between a first state wherein said vehicle function is disabled and a second state wherein said vehicle function is enabled based on an output signal associated with said at least one vehicle function from said control circuit;

wherein said control circuit generates said output signal associated with said at least one vehicle function based on said input signal from said at least one input switch and the state of said at least one vehicle function is maintained until a subsequent output signal associated with said at least one vehicle function from said control circuit is received by said at least one function switch.

2. The signal control system of claim 1 further including a vehicle speed sensor sensing vehicle speed and producing a vehicle speed signal corresponding thereto, said speed signal being receivable by said control circuit and said control circuit including means for comparing said vehicle speed to a predetermined speed value.

3. The signal control system of claim 2 wherein said control circuit further includes a timer and means for comparing a timer value to a predetermined timeout value.

4. The signal control system of claim 3 wherein said at least one vehicle function includes left and right turn signals and said at least one function switch includes corresponding left and right turn signal switches, and said control circuit generates corresponding output signals receivable by said left and right turn signal switches to disable said left and right turn signals when said turn signals are enabled and said timer value exceeds said predetermined timeout value.

5. The signal control system of claim 4 wherein said output signals to disable said left and right turn signals are suppressed when said vehicle speed is less than said predetermined speed value.

6. The signal control system of claim 2 wherein said at least one vehicle function includes left and right turn signals and said at least one function switch includes corresponding left and right turn signal switches, and said control circuit generates corresponding output signals receivable by said left and right turn signal switches to disable said left and right turn signals when said turn signals are enabled while said vehicle speed is less than said predetermined speed value and said vehicle speed subsequently exceeds said predetermined speed value.

* * * * *